July 28, 1959     R. D. VOGLER     2,896,880
ROTARY SPOILERS FOR USE IN LATERAL CONTROL OF AN AIRPLANE
Filed Jan. 13, 1954

INVENTOR
RAYMOND D. VOGLER

BY
ATTORNEYS

United States Patent Office

2,896,880
Patented July 28, 1959

2,896,880

ROTARY SPOILERS FOR USE IN LATERAL CONTROL OF AN AIRPLANE

Raymond D. Vogler, Hampton, Va., assignor to the United States of America as represented by the Secretary of the Navy Application January 13, 1954, Serial No. 403,945

5 Claims. (Cl. 244—42)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in control devices for aircraft.

Generally, aircraft lateral control involves some device that increases or decreases the amount of lifting force on its wing. This device may be operated by the pilot or, in the case of missiles, by electronic stimuli. Devices now in use are ailerons, portions of the trailing edge of the wing hinged about an axis in or approximately parallel to the chordplane of the wing, or spoilers which emerge from the wing surface into the airstream spoiling the flow and thereby reducing the lifting force on the wing. These devices now in use have disadvantages, especially at high speeds. On present military airplanes the force necessary for their operation may exceed the strength of the pilot even with the aid of a complicated boost system. This hinge moment force also may reverse itself in direction for small initial movements of the ailerons or spoilers thereby disconcerting the pilot. Moreover, cutouts in the wing for spoilers weaken the wing structure, and ailerons are subject to flutter. Accordingly, an object of the invention is to provide means for obtaining lateral control of an airplane without introducing large hinge moments for the pilot to overcome during operation, thereby reducing or eliminating the need for complicated boost systems.

The above object may be attained by many specific embodiments of the invention, one of which provides the basis for a more specific object of the invention which is to provide a lateral control device requiring no mechanical or electrical actuating means, but rather, one which is responsive to the airstream contiguous to the surface over which it is operable.

Other objects and features of importance will become apparent in following the description of the illustrated form of the invention, wherein.

Figure 1:
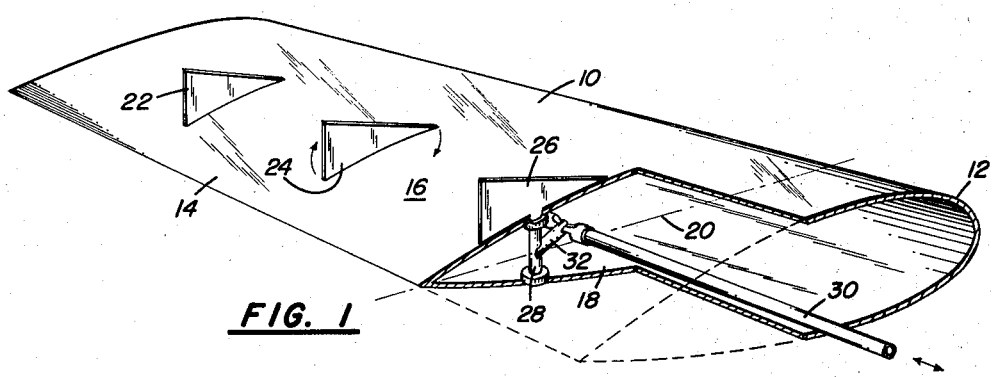
Fig. 1 is a fragmentary perspective view of a schematically depicted wing with one form of the lateral control device applied thereto.

In Fig. 1 there is a wing fragment 10, the usual conventions thereof being retained, that is, the leading edge 12, trailing edge 14, upper surface 16, lower surface 18, and for reference purposes, the chord 20. Lateral control of an aircraft of which wing 10 is a part is obtained by the rotary spoiler vanes 22, 24 and 26, it being understood that a larger or smaller number of spoiler vanes may be used. Each vane, as vane 26, has a spindle 28 secured to it, and the spindles have means to rotate them about a longitudinal rotation axis of each of the spindles.

The push rod 30 slidably connected with arm 32, the latter being fixed to and extending laterally of spindle 28, constitute the spoiler vane actuating means for vane 26, there being an identical arrangement of arms 32 with rod 30 and the spindles 28 for vanes 22 and 24. Rod 30 is to be connected with suitable means to provide the pilot or automatic pilot with a control element for adjusting the vanes.

The spindle 28 is fitted in suitable bearings in wing 10, and the spindle axis is approximately normal to chord 20, this axis being also approximately normal to wing surface 16. Thus, the spoiler vanes are movable about the spindle axis to present more or less area to the airstream, depending on the amount of rolling moment desired by the pilot. Note that the vanes are always in the airstream, as opposed to being retracted in the wing when little or no control force is desired. No cutouts in the wings to accommodate the full vane size are necessary, making it possible to use rather large vanes. Presently used control surfaces, as an aileron, are erratic upon their initial entrance into the airstream, especially at high speeds. This is avoided since the vanes are always in the airstream over the wing surface on which they operate, that is, either the upper or lower surface. In case of linkage failure, the vanes 22, 24 and 26 will always float safely in a neutral position.

Figure 2:
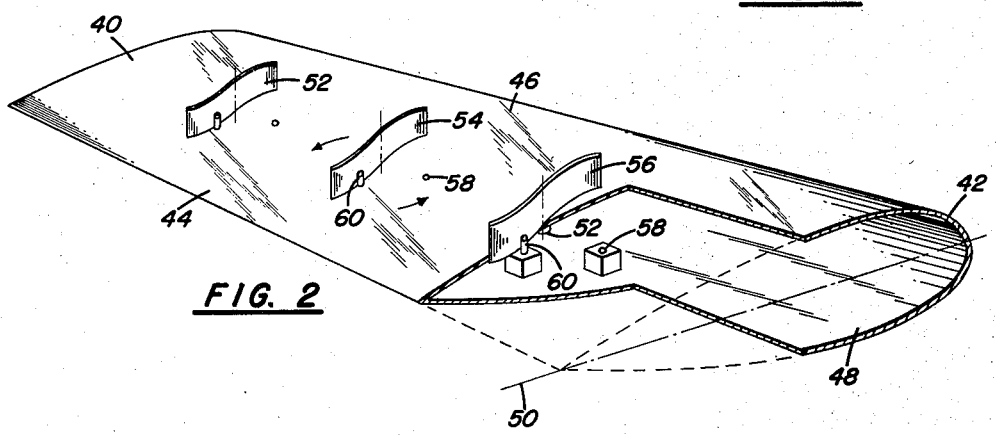
Fig. 2 is a fragmentary perspective view of a schematically depicted wing with a second form of the lateral control device applied thereto.
Figure 6:
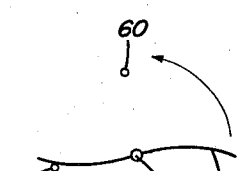
Figure 7:
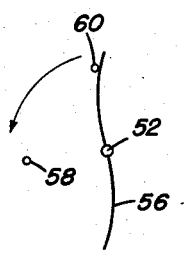

In Fig. 2, wing 40 is similar to wing 10 to the extent of having the same parts. There is a leading edge 42, a trailing edge 44, upper surface 46, lower surface 48, and chord 50. The control device includes vanes 52, 54 and 56, each being S-shaped or other self actuating design, and each vane is mounted for rotation about an axis substantially normal to the wing surface 46 and chord 50. Spindles 52, freely rotatable in bearings in wing 40, are used to mount the vanes for rotary movement.

The system employed for adjusting the vanes 52, 54 and 56 is considered unique and consists of two stops 58 and 60 for each vane and spaced ninety degrees from each other on an arc measured from the axis of rotation of the vanes. The stops may be any type of mechanical element that is suitable, one example being solenoid armatures (Fig. 2) movable through small holes in the wing so that they may be extended into and retracted from the path of rotation of the vane with which they cooperate.

Figure 3:
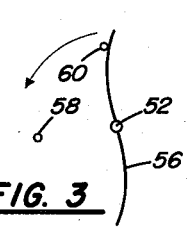
Figs. 3 to 7 are schematic plan views of a part of the control device of Fig. 2, illustrating a complete cycle of operation thereof.
Figure 4:
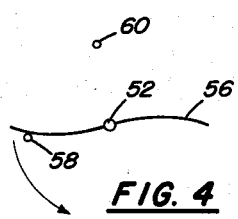
Figure 5:
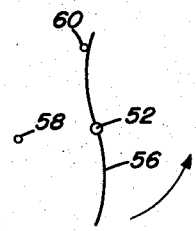

The operation is as follows assuming a wind direction W. Fig. 3 shows the vane 56 in a neutral position, aligned with the wind, and restrained by pin or stop 60 protruding through wing surface 46. When pin 60 is withdrawn, the wind automatically rotates the vane 56 counter-clockwise due to its shape, until it strikes pin 58 (Fig. 4). In this position, the vane 56 produces rolling moments on the airplane or the like to which the wing 46 is attached. When pin 58 is withdrawn, the vane 56 returns to a neutral position (Fig. 5). By alternately withdrawing pins 58 and 60 and relying on energy from the airstream, the vane 56 will make a complete revolution in steps of quarter revolutions, as shown in steps in Figs. 3–7.

A switch which energizes the solenoid with stop 58 and deenergizes the other solenoid, may be used to control the stops 58 and 60. However, other means to hold the vanes 52, 54 and 56 may be used, such as ratchet and pawl mechanisms, or any other suitable, known mechanical movement that yields the desired step by step movement.

In the embodiments of Figs. 1 and 2, the function of the vanes is to change the lift on the wing rather than to produce additional lift, as an aileron or flap. The basic distinction is the vane rotation, either a full or part of a revolution, about an axis approximately perpendicular to the chord of the wing, or in a plane approximately normal to the wing surface; and the vanes being present always in the airstream as opposed to being inserted and removed therefrom.

Although the invention is described in connection with lateral control surfaces on wings, the invention may be practiced on any part of an airplane including the fulselage. It may be used for obtaining longitudinal control, directional control and speed control. Other departures, as fall within the scope of the claims, may be made without departing from the claims.

What is claimed is:

1. In a wing having an upper and a lower surface together with a leading and a trailing edge, a lateral control means for the wing comprising a plurality of vane means distributed along the upper surface of said wing to be operable when actuated to substantially decrease the major portion of the lift forces acting upon said wing in flight; each of said vane means comprising a vane, said vane having its front and aft edges located between said wing trailing and leading edges, and means secured to said vane mounting the latter for rotary motion about an axis approximately normal to said upper surface of said wing.

2. In a wing which has a chord, a lateral control means comprising a plurality of vane means distributed along the upper surface of said wing to be operable when actuated to substantially decrease the major portion of the lift forces acting upon said wing in flight; each of said vane means comprising a vane, a spindle connected to the vane, means mounting said spindle intermediate the leading and trailing edges of said wing, said spindle having a rotation axis substantially normal to said chord, said vane being longitudinally S-shaped so that while the wing is in flight said vane has a wind stream applied rotational force thereon, and means for stopping and holding said vane in a selected position.

3. The combination of claim 2 and said stopping means including pins retractile in the wing and movable into the path of motion of said vane.

4. The combination of claim 3 and there being two of said pins separated ninety degrees from each other as measured from the axis of rotation of said spindle.

5. In an aircraft wing devoid of ailerons, means to provide lateral control comprising a plurality of vane means distributed along the upper surface of said wing to be operable when actuated to substantially decrease the major portion of the lift forces acting upon said wing in flight; each of said vane means comprising a vane, and a means rotatably supporting said vane means for movement between positions presenting more or less area to the airstream, whereby to provide a rolling moment.

References Cited in the file of this patent

UNITED STATES PATENTS

| | | |
|---|---|---|
| 154,407 | Mason | Aug. 25, 1874 |
| 2,559,823 | Klose | July 10, 1951 |
| 2,595,363 | Lee | May 6, 1952 |
| 2,599,484 | Rhodes | June 3, 1952 |
| 2,705,934 | Kefeli | Apr. 12, 1955 |